United States Patent [19]

Malinski et al.

[11] 4,273,307
[45] Jun. 16, 1981

[54] CLUTCH FOR VALVE ACTUATOR

[75] Inventors: Richard F. Malinski, Schaumburg; John Sikorcin, St. Charles, both of Ill.

[73] Assignee: Vapor Corporation, Chicago, Ill.

[21] Appl. No.: 943,576

[22] Filed: Sep. 18, 1978

[51] Int. Cl.³ .......................... F16D 13/08; F03G 1/00
[52] U.S. Cl. ..................... 251/69; 185/40 R; 192/26; 192/81 C; 192/84 T
[58] Field of Search ................ 185/40 R; 192/12 BA, 192/26, 37, 41 S, 56 C, 81 C, 84 T; 251/69

[56] References Cited

U.S. PATENT DOCUMENTS

| 2,883,022 | 4/1959 | Clausing et al. .................. 192/26 |
| 2,930,463 | 3/1960 | Dodge et al. .................. 192/56 C X |
| 3,110,192 | 11/1963 | Hood .............................. 192/41.5 X |
| 3,216,392 | 11/1965 | Shimanckas .................... 192/41 S X |
| 3,808,895 | 5/1974 | Fitzwater .......................... 251/69 X |
| 3,850,275 | 11/1974 | Helander .............................. 192/26 |
| 3,934,690 | 1/1976 | Janning .............................. 192/84 T |
| 4,090,589 | 5/1978 | Fitzwater .......................... 251/69 X |

Primary Examiner—Allan D. Herrmann
Attorney, Agent, or Firm—Francis J. Lidd

[57] ABSTRACT

A valve actuator utilizing a drive motor and a stored energy device to operate valves primarily in safety related applications is disclosed. The actuator operates on signal or loss of power to return a driven valve to a predetermined position. The actuator in particular utilizes unidirectional coupling between a driven shaft and an output shaft that is coupled to the driven valve. Specifically, the coupling utilizes a coiled spring having a unique diametral relationship with the driven shaft in order to insure reliable actuation and control of shaft wear. A fluid dampened device or dashpot is also utilized to provide controlled operation during the return cycle that is powered by the stored energy device.

10 Claims, 8 Drawing Figures

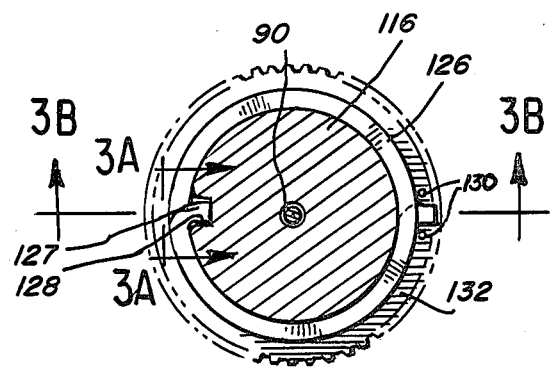
FIG. 2
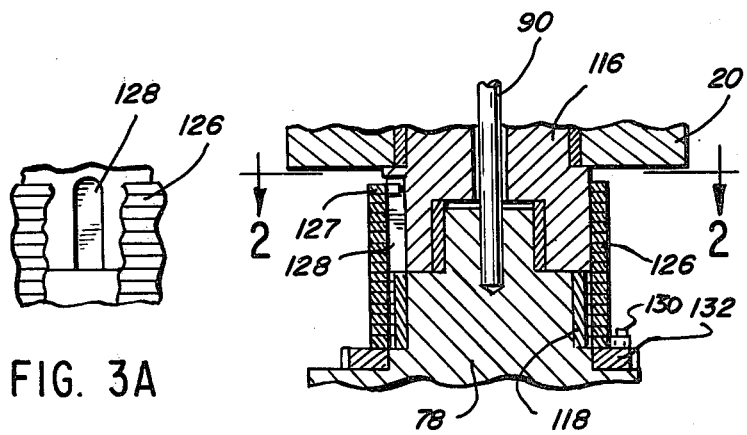
FIG. 3A
FIG. 3B

CLUTCH FOR VALVE ACTUATOR

BACKGROUND OF THE INVENTION

This invention relates generally to mechanical valve actuators, and more particularly to those employing a stored energy component which provides nonpowered return of the valve on command or in case of a loss of power, return to a predetermined valve position.

The unit disclosed in its preferred embodiment uses an electrically operated gear motor coupled to an input shaft which in turn is directionally connected to an output shaft through a spring clutch. A torsion coil spring surrounds the input and output shafts and is connected so as to store energy generated by the drive motor.

The output shaft also utilizes a hydraulic dampening device operating by a pinion gear on the output shaft and an associated gear rack for driving an orificed piston in a hydraulic cylinder. The dampening system provides controlled operation when the actuator returns its coupled valve under the influence of torque supplied by the torsion spring.

Prior art actuators utilize torsion springs for storage of energy from the primary drive motor in connection with electro-mechanical clutches, or mechanical unidirectional couplings located between the drive motor and output shaft, such as ratchets, dog clutches, and friction clutches. These units, in particular, subject clutch components to large peak torque values on initiation and termination of the spring return cycle. In addition, an electro-mechanical version is substantially complex in that it includes an electro-magnetic winding which requires a control system of increased complexity. These devices, while satisfactory to some degree, are more expensive and somewhat less reliable.

An actuator of the electro-mechanical type is disclosed in U.S. Pat. Nos. 3,808,895 and 4,090,589 incorporated by reference herein.

The electro-mechanical, prior art actuator, utilizes a circumferential spring clutch connecting the input and output shafts. Actuation is accomplished through a releasable mechanical latch that restrains motion of the spring on the driven or output shaft. However, it has been found that the operation of this clutch has been somewhat unreliable in that it does not predictably control the actuating areas, resulting in excessive and uncontrollable wear on the mating shafts.

Other prior art clutches, such as those disclosed in U.S. Pat. Nos. 2,723,013 and 2,883,022, utilize a torsion spring surrounding the drive and driven shafts in order to effect directional drive; however, these units require a torque reversal between the driving and driven shafts, that is initiated by the driving shaft. Since in the operation of the valve actuator disclosed herein, the driving shaft essentially moves to a position against the stored energy spring and the valve actuating torque thereby holding the valve in that position for indefinite periods of time, torque reversals initiated by the driving shaft do not occur. Additionally, internal friction associated with the spring driven valve and the remainder of the drive assembly of the present actuator prevents the storage spring from releasing the driven shaft while only its lower or output end is allowed to rotate.

Therefore, it is an object of this invention to provide a unidirectional spring coupling between the rotating shafts of a valve actuator which reliably releases when a predesignated end of the spring is released to rotate while the actuator is in a "stalled" or held against a valve stop.

It is a further object of this invention to provide a unidirectional spring clutch for coupling rotating shafts where no relative motion between the shafts occurs prior to the release operation.

SUMMARY OF THE INVENTION

According to the invention, an improved unidirectional spring clutch is disclosed. The clutch is preferably intended for use between axially aligned shafts. The clutch of the present invention provides improved operation and, more particularly, positive release of a driven shaft when no relative motion of the driven or a driving shaft is possible prior to declutching or release.

As disclosed, the clutch is utilized in a spring return type valve actuator wherein the primary drive forces the output shaft and its valve closure member to a predetermined position while simultaneously winding a return spring. On command, it is necessary to release the driven shaft allowing a stored energy device such as a torsion spring to return the closure member to its initial position.

Proper clutch operation is provided by utilizing a coil spring surrounding both the driven and driving shafts with an end fixed to the driving shaft at the initial end of the spring. The portion of the spring that engages the driven end includes a somewhat oversized inner diameter in the de-energized position. A releasable retainer is used to restrain another end of the spring. Sufficient torque is exerted by the spring portion engaging the driven shaft member so that on release of the retainer, the portion of the spring engaging the driven end returns to a diameter larger than that of the driven shaft.

BRIEF DESCRIPTION OF THE DRAWINGS

FIG. 2 is a section along the lines 2—2 of FIG. 1 showing the driving shaft and particularly showing the means for fastening the upper end of the clutch spring to the shaft;

FIG. 3A is a section along the lines 3A—3A of FIG. 2;

FIG. 3B is a section along line 3B—3B of FIG. 2;

DETAILED DESCRIPTION OF INVENTION

Figure 1:
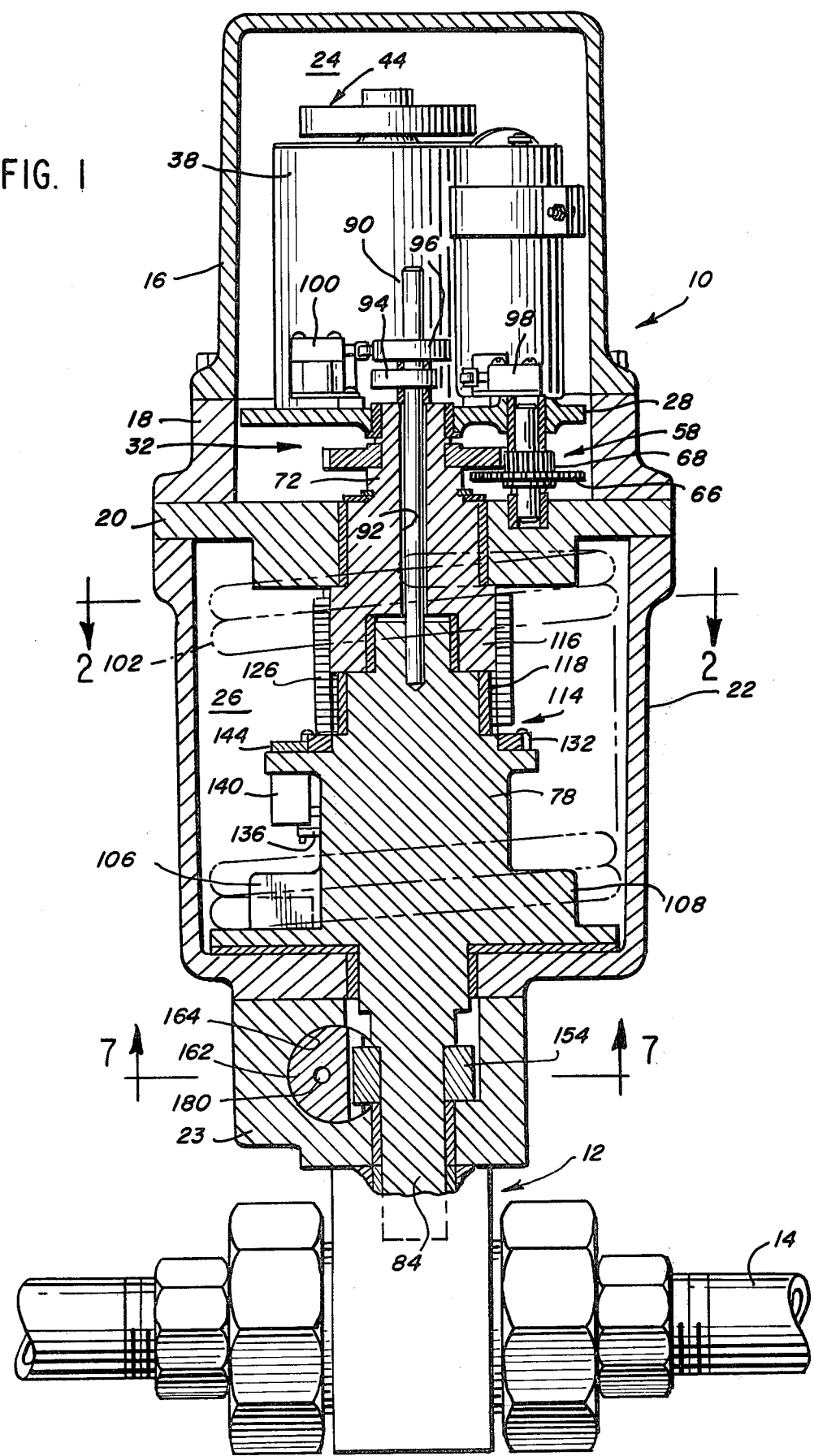
FIG. 1 is an elevational view of the actuator disclosed mounted on a typical valve. The actuator is shown in partial section, particularly in the region adjacent to the driven and driving shafts in order to show more clearly the invention disclosed.
Figure 4:
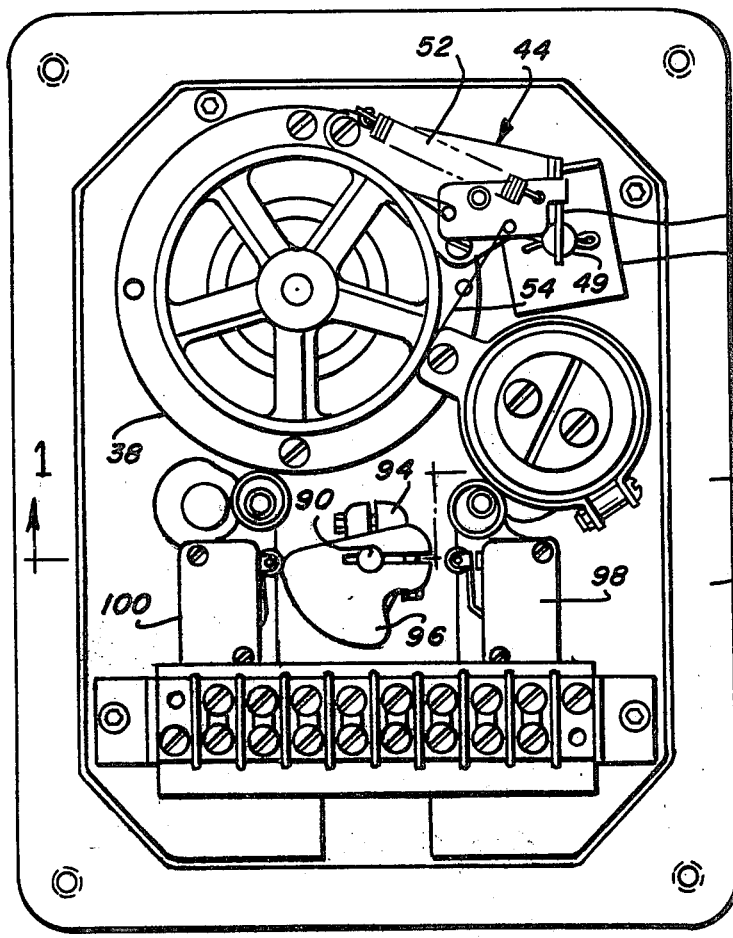
FIG. 4 is a plan view of a preferred but not exclusive motor driven valve actuator.

Referring to FIG. 1 and 4, an actuator 10 is disclosed mounted on and connected to a drive valve 12 carrying fluid in a conduit 14. The actuator further utilizes a cover 16, a ring cover adapter 18, top plate 20, a lower housing 22 and a cylinder housing 23. An actuator similar to the actuator 10 is disclosed in U.S. Pat. No. 4,090,589 and is incorporated by reference herein.

The top plate 20 generally divides the housing into chambers 24 and 26, each respectively containing the actuator/electrical drive components and the torsion spring/clutch dirve components. The lower chamber 26 contains the torsion self-return spring 102 and the clutch 114 consisting of the clutch spring 126, generally surrounding the driving shaft 72 and the driven shaft 78.

A wear ring 118 surrounds the lower or output shaft 78 in the contact area of the spring 126.

The upper chamber 24 also contains a brake mechanism 44, utilizing an electromagnetic solenoid 48 and extensible members 49 and 50, moving inwardly as shown in FIG. 4 so as to overcome the bias of spring 52, thereby releasing the brake mechanism 44 by loosening the tension on the brake band 54.

In operation, simultaneous energization of the solenoid 48 and the motor 38 provide torque to operate the driving shaft member 116 through the gear reduction unit generally shown in FIG. 1 as 32. Although the drive system depicted here is, generally speaking, a gear motor drive, those skilled in the art will readily understand that other means for applying turning torque to the shaft 116 will function equally as well.

Electrical operation of the electromagnetic motor brake 44 is essentially controlled through a cam mechanism carried by the output shaft 78. The mechanism comprises a rod 90, freely extending through an axial bore 92 in the driving shaft 72 and fastened at its lower end in the output shaft 78. Therefore, rotation of the output shaft is essentially monitored by the rod 90. Cams 94 and 96 carried on the rod 90 operate limit switches 100 and 98 and the cams 94 and 96 may be adjusted to initiate and terminate the operation of the drive motor 38 and the clutch at pre-determined points while rotating the output shaft 84 and, hence, turning the rotatable member of the valve 12.

To provide a returning action of the valve 12 a helical, stored energy spring 102 is provided and includes one end that is fixed to the top plate 20 and a second end held in a slot 106 in the lower portion 108 of the driven or output shaft 78. The spring 102 is wound by the spring 126 when shaft 116 is coupled to and rotates shaft 78. Once wound, spring 102 delivers torque to shaft 78 upon release of the clutch 114.

Turning now to the features of the clutch 114 disclosed in this application. As shown in FIGS. 1, 2, 3A, 3B, 5 and 6 a torsional spring 126 wound of essentially rectangular wire surrounds portions of the upper or driving shaft 116 and the lower or driven shaft 78. The driving 116 and the driven 78 shafts are rotatably mounted and are free to turn relative to one another when the clutch mechanism 114 is disengaged.

Figure 5:
FIG. 5 is an elevational view of the disclosed unidirectional clutch showing the fixed and releasable anchoring means of the clutch spring.

As seen in FIGS. 3A, 3B, and 5 the upper end of the clutch spring 126 is fixed in the shaft 116 by means of a tang 127 engaged in a slot 128 (FIG. 2). The lower end of the spring 126 is fixed in a clutch gear 132 fixed to the shaft 78 by means of two pins 130 in the gear 132.

Figure 6:
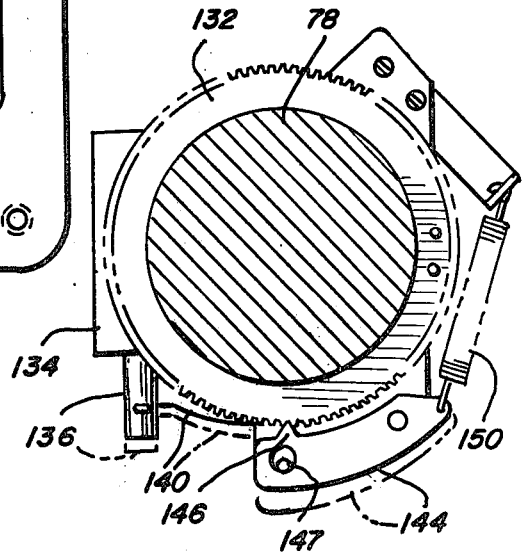
FIG. 6 is a partial section view along the lines of Section 6—6 of FIG. 5.
Figure 7:
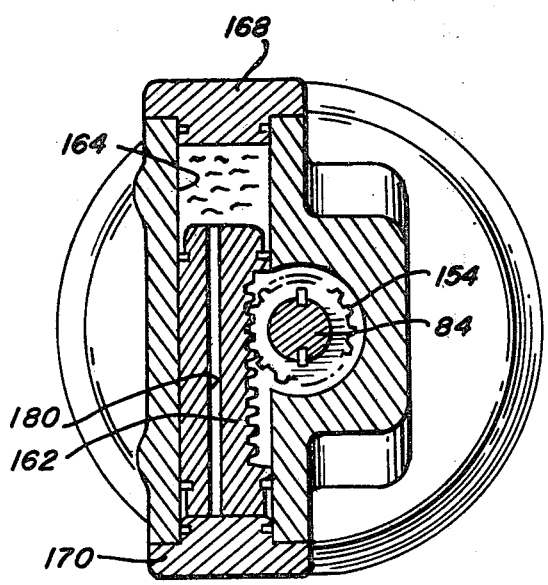
FIG. 7 is a partial section view taken along the line 7—7 of FIG. 1.

To return the valve 12 to a predetermined position under certain conditions, the lower end of the clutch spring 126 is released allowing the stored energy to rotate the shaft 78. Release of the lower end of the clutch spring 126 is effected by extracting a pawl 146 from the ring gear 132 as shown in dotted lines on FIG. 6. A solenoid actuator 134 including an armature 136 is connected to a movable arm 144 by a pin 147 extending from a solenoid actuated lever 140. As shown in FIGS. 5 and 6, as the solenoid actuator 134 is extended, the armature 136 rotates the lever 140 and the pin 147 with the lever 140 abutting the movable arm 144 whereupon the pawl dog 146 is disengaged from the teeth of the gear 132 thus releasing the clutch spring 126. In FIG. 6 the solenoid 134, as illustrated, is secured to a solid object. This object may be a wall, the housing, or, in the preferred embodiment, a part or portion of the output shaft 78 so as to be movable therewith. The solenoid 134 may also be secured to the input shaft or wear ring.

Additionally, although not a part of this invention, the output shaft 84 operates a spur gear 154 which in turn drives a gear rack 162 to impart longitudinal motion to a piston in a hydraulic cylinder 164. The cylinder 164 is essentially sealed by end plates 168 and 170 and contains a viscous hydraulic fluid such as oil.

In operation, rotation of the shaft 84 and gear 154 moves the rack 162 in the cylinder 164 forcing fluid through a longitudinal oriface 180 contained in the rack 162 such that the rack 162 essentially acts as a piston in the cylinder 164. This structure provides controlled viscous damping, which essentially reduces peak mechanical forces due to inertia, encountered during the spring return of the valve as described above.

In operation, the drive motor 38 and gear train 32 turn the driving shaft 116 which in turn rotates the clutch spring 126. In keeping with the invention described above, the portion of the spring 126 surrounding the wear ring 118 on the driven shaft 78, does not initially engage the wear ring 118 surface. (FIGS. 1 and 3B) The spring 126 does, however, initially engages and applies a radial compressive force on the driving shaft 116.

If it is desired to operate the valve through shaft 84, the clutch solenoid 134 is actuated simultaneously with the drive motor 38 and the drive motor brake solenoid 48, thereby releasing the motor shaft and engaging the lower end of the clutch spring 126 through the gear 132 as described above. Once this is accomplished, rotation of the shaft 116 proceeds until the portion of the spring 126 adjacent to the wear ring 118 is sufficiently wound to reduce the diameter of that portion sufficiently to engage the surface of the ring, 118. This engagement then allows torque transmission from the shaft 116 to the driven shaft 78 thereby operating the valve.

As the shaft 78 is rotated, the spring 102 is also wound due to its upper end being fixed in the adapter plate 20 and its lower end being fixed in the valve shaft at 108 thereby storing energy for later return operation.

When the valve actuating member reaches its limit, generally after an approximately 90 degree rotation, the position is detected through the cams 94, 96 and power to the motor is interrupted. At this time, the brake release solenoid 48 is also de-energized applying the brake 44 thereby preventing any further rotation of the motor shaft in either direction. It should be further noted, however, that the clutch release solenoid 134 is not released when normal valve operation is required.

In the event of an emergency or some safety related action, it becomes necessary to return the valve to its initial position without motor power. This is accomplished by de-energizing solenoid 134 thereby retracting the clutch pawl dog 146 from the gear 132 through the bias force of a spring 150.

In this condition and in sharp difference with the prior art, the driving shaft 72 is held by its brake and the valve member 12, having reached the limit of its travel, is also substantially restrained. Release of the solenoid 134 would not, using the construction of prior art clutches, result in a release of the lower portion of the spring 126; however, since the spring 126 includes an unstressed inside diameter somewhat greater than the diameter of the driven shaft at the wear ring 118, release of the dog 146 allows the spring to return to its initial diameter, thus releasing the shaft 78 and allowing the spring 102 to utilize its stored energy to return the valve member to its initial position.

Therefore, in accordance with the above description, there has been provided an unidirectional spring clutch providing reliable operation wherein the engagement of the drive and driven shafts occurs over a controlled portion of the operation and the release of the driven member is consistently obtained without the relative motion of the driving member.

While the novel clutch described above is disclosed in conjunction with a "typical" electro-magnetic actuator it will be evident to those skilled in the art that many alternative modifications and variations can be developed in the light of the foregoing description. Accordingly, it is intended to embrace all such alternatives, modifications and variations as fall within the spirit and scope of the following claims.

What is claimed and desired to be secured by Letters Patent is:

1. In a rotary valve actuator of the type employing a drive motor, an energy storage spring between said drive motor and a valve providing powered rotation of an output shaft secured to said valve to a pre-determined valve position, and self-powered return to an original valve position, the improvement comprising:
   a drive motor shaft axially aligned with and abutting a valve-operating shaft; a helical torsion spring surrounding at least a portion of said motor shaft and said valve operating shaft; said torsion spring including first and second ends, said first end affixed to said drive motor shaft, said spring exerting positive radial compression on at least a portion of the drive motor shaft;
   means releasably attaching said second end to said output shaft;
   wherein actuating said attachment means, and rotation of said drive motor shaft provides positive radial compression between said spring and output shaft to provide operational torque to turn said valve and wind said storage spring; and,
   wherein release of said second end reduces said valve shaft radial compression allowing opposite rotation of said valve shaft without input drive shaft movement.

2. The improvement set forth in claim 1 further comprising means for releasing said second end of said torsion spring.

3. The inprovement set forth in claim 1 further including a wear member positioned between said spring and said output shaft.

4. The improvement set forth in claim 1 wherein said energy storage spring is secured to said actuator and said valve operating shaft.

5. An unidirectional clutch for controllably transmitting rotary torque from generally axially aligned driving and driven shafts including a common abutting interface comprising;
   a resilient member of a rectangular cross-section including first and second ends and helically surrounding said interface, said first end attached to said driving shaft and exerting positive radial compression on at least a part of said driving shaft;
   means releasably fixing said second end of said resilient member relative to said driven shaft;
   wherein rotation of said drive shaft with said first and second ends fixed provides positive radial compression between said resilient member and said shafts adjacent said interface, said resilient member thereby transmitting torque from the driving to the driven shaft, turning said driven shaft; and,
   on release of said second end, the radial compression on said driven shaft is reduced allowing rotation in an opposite direction of said driven shaft.

6. The clutch claimed in claim 5 wherein said resilient member is out of engagement with said driven shaft prior to rotation of said drive shaft.

7. In an actuator of the type for actuating a valve, said actuator including a driving member, means for driving said driving member, a driven member secured to said valve for actuation thereof, said driven member adapted to be driven from a first angular position to a second angular position by said driving member, and means for returning said driven member from said second position to said first position, the improvement comprising:
   a resilient element spirally wound to encircle said driven and driving members;
   said resilient element including a first end secured to said driving member and a second end releasably secured to said driven member;
   the inner periphery of said resilient element engaging said driving member and applying a compressive force thereon;
   said inner periphery of said resilient element being out of engagement with said driven member in said first position and in engagement with said driven member in said second position.

8. The improvement set forth in claim 7 further comprising means for releasing said second end of said resilient element.

9. The improvement set forth in claim 8 further comprising means for returning said driven member from said second position to said first position upon release of said said second end.

10. The improvement set forth in claim 7 further comprising a wear ring mounted on said driven member between said driven member and said resilient element.

* * * * *